(12) United States Patent
Bozorgtabar et al.

(10) Patent No.: US 10,229,499 B2
(45) Date of Patent: Mar. 12, 2019

(54) SKIN LESION SEGMENTATION USING DEEP CONVOLUTION NETWORKS GUIDED BY LOCAL UNSUPERVISED LEARNING

(71) Applicant: International Business Machines Corporation, Armonk, NY (US)

(72) Inventors: Seyedbehzad Bozorgtabar, Melbourne (AU); Rahil Garnavi, Melbourne (AU); Pallab Roy, Melbourne (AU); Suman Sedai, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/858,191

(22) Filed: Dec. 29, 2017

(65) Prior Publication Data

US 2018/0122071 A1 May 3, 2018

Related U.S. Application Data

(63) Continuation of application No. 15/442,151, filed on Feb. 24, 2017.

(Continued)

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4628* (2013.01); *G06K 9/6269* (2013.01);
(Continued)

(58) Field of Classification Search
None
See application file for complete search history.

(56) References Cited

U.S. PATENT DOCUMENTS

| 2013/0226548 A1* | 8/2013 | Beck | G06F 19/12 703/11 |
| 2015/0065803 A1* | 3/2015 | Douglas | A61B 1/00009 600/200 |

OTHER PUBLICATIONS

Garnavi, R. et al., "Border detection in dermoscopy images using hybrid thresholding on optimized color channels". Computerized Medical Imaging and Graphics, (2011), 35(2), 105-115.

(Continued)

*Primary Examiner* — Shervin K Nakhjavan
(74) *Attorney, Agent, or Firm* — Grant Johnson; Otterstedt, Ellenbogen & Kammer, Esq.

(57) ABSTRACT

A dermoscopic lesion area is identified by: Obtaining a dermoscopic image and running a convolutional neural network image classifier on the dermoscopic image to obtain pixelwise lesion prediction scores. Segmenting the dermoscopic image into super-pixels, and computing for each super-pixel an average of the pixelwise prediction scores for pixels within that super-pixel. Computing a mean prediction score across the plurality of super-pixels. Assigning a confidence indicator of "1" to each super-pixel with a prediction score equal or greater than the mean prediction score, and a confidence indicator of "0" to each super-pixel with a prediction score less than the mean prediction score. Constructing a super-pixel graph G=(V,E,W) wherein $$w_{ij} = \exp\left(-\frac{\|x_i - x_j\|^2}{\sigma}\right) \text{ and } d_i = \sum_{i=1}^{N} w_{ij};$$

computing a confidence score function F according to $\hat{F}=\arg\min(F^T LF + \mu \|F-Y\|^2)$; and integrating the confidence score (Continued)

function F with the pixelwise prediction scores to produce a final segmentation of the dermoscopic image into lesion and background areas.

6 Claims, 7 Drawing Sheets

Related U.S. Application Data

(60) Provisional application No. 62/381,998, filed on Aug. 31, 2016.

(51) Int. Cl.
*G06T 7/11* (2017.01)
*G06K 9/62* (2006.01)
*G06K 9/46* (2006.01)
*G06N 3/04* (2006.01)

(52) U.S. Cl.
CPC .............. *G06T 7/11* (2017.01); *G06N 3/0454* (2013.01); *G06T 2207/30088* (2013.01); *G06T 2207/30096* (2013.01)

(56) References Cited

OTHER PUBLICATIONS

Cavalcanti, P. G., "Pigmented skin lesion segmentation on macroscopic images". Image and Vision Computing New Zealand (IVCNZ), IEEE 2010 25th International Conference of, pp. 1-7.
Celebi, M. E. et al. "Border detection in dermoscopy images using statistical region merging". Skin Research and Technology, (2008), 14(3), 347-353.
Li, C. et al. "Minimization of region-scalable fitting energy for image segmentation". IEEE transactions on image processing, (2008), 17(10), 1940-1949.
Erkol, B. et al., "Automatic lesion boundary detection in dermoscopy images using gradient vector flow snakes". Skin Research and Technology, (2005), 11(1), 17-26.
Long, J. et al., "Fully convolutional networks for semantic segmentation". Proceedings of the IEEE Conference on Computer Vision and Pattern Recognition (2015) pp. 3431-3440.
Badrinarayanan, V. et al. "Segnet: A deep convolutional encoder-decoder architecture for image segmentation". arXiv preprint arXiv:1511.00561 (2015).
Chen, L.C. et al., "Semantic image segmentation with deep convolutional nets and fully connected CRFs". arXiv preprint arXiv:1412.7062 (2014).
Farabet, C, et al., "Learning hierarchical features for scene labeling". IEEE transactions on pattern analysis and machine intelligence, (2013), 35(8), 1915-1929.
Yan, J. et al., "Object detection by labeling superpixels". Proceedings of the IEEE Conference on Computer Vision and Pattern Recognition (2015) pp. 5107-5116.
Belkin, M. et al., "Laplacian Eigenmaps for dimensionality reduction and data representation". Neural computation, (2003), 15(6), 1373-1396.
Mendonca, T., et al., "PH 2-A dermoscopic image database for research and benchmarking". 35th Annual International Conference of the IEEE Engineering in Medicine and Biology Society (EMBC) (2013) pp. 5437-5440.
NITST, "The NIST Definition of Cloud Computing". Special Publication 800-145. (2011), pp. 1-7.
Seyedbehzad Bozorgtabar et al., published U.S. Appl. No. 15/442,151, filed Feb. 24, 2017, Skin Lesion Segmentation Using Deep Convolution Networks Guided by Local Unsupervised Learning, pp. 1-26 plus 7 sheets of drawings.
Paul J. Otterstedt, List of IBM Patents or Patent Applications Treated As Related, Aug. 3, 2018, pp. 1-2.

\* cited by examiner

SKIN LESION SEGMENTATION USING DEEP CONVOLUTION NETWORKS GUIDED BY LOCAL UNSUPERVISED LEARNING

CROSS REFERENCE TO RELATED APPLICATIONS

This application is a continuation of U.S. patent application Ser. No. 15/442,151, filed Feb. 24, 2017, which claims the benefit under 35 U.S.C. § 119(e) of U.S. Provisional Patent Appl. No. 62/381,998 filed Aug. 31, 2016 and entitled "SKIN LESION SEGMENTATION USING DEEP CONVOLUTION NETWORKS GUIDED BY LOCAL UNSUPERVISED LEARNING," the complete disclosures of which are expressly incorporated herein by reference in their entirety for all purposes.

BACKGROUND

The present invention relates to the electrical, electronic, and computer arts, and more specifically, to use of computers for automated diagnosis of medical image data.

Skin lesion segmentation is the first and a key step of computer-aided skin lesion diagnosis (CAD) and has significant implications for diagnosis system of melanoma. While the task of segmenting skin lesion is important, it is particularly challenging due to high variability of the lesion shape, presence of artefacts (e.g. hair and fiducial markers) and/or when there is a large color distribution for the skin lesion area. To address these difficulties in the segmentation task, several techniques have been proposed. Regarding classical algorithms, there are three main groups that include threshold-based, region growing, and active-contour-based methods.

Recently, deep learning based segmentation approaches have been proposed, which aim to predict pixel-wise labelling of the images. These approaches demonstrate superior performance over classical methods in terms of accuracy in segmentation task. More recently, different post-processing techniques such as Markov Random Field (MRFs) have been presented to solve these problems. Further, feature maps of the classification network have been used with an independent Conditional Random Field (CRF) post-processing technique to do segmentation.

Some other recent methods consider additional inference techniques such as region proposal (e.g. super-pixels). For example, there is a segmentation method, where the raw input image is transformed through a multi scale convolutional network, which produces a set of feature maps. The feature maps of all scales are concatenated, then the coarser-scale maps are upsampled to match the resolution of the finest image scale map. In parallel, a single segmentation technique using super-pixels is devised to exploit the natural contours of the image. Finally a supervised classifier is used to classify each super-pixel by computing the average class distribution of the dense features within the super-pixels.

Alternatively, the object detection is formulated as a multi-class super-pixel labelling problem. An energy minimization algorithm is implemented with several terms such as data cost, smooth term and label cost. The data cost is learned through a convolutional neural network. Following that, the smooth term and label cost term are used to obtain the final labelling of the super-pixels. The parameters in the labelling model are learned through a structural SVM. The super-pixel labels and pixelwise labels are combined in a supervised way to obtain a final segmentation outcome.

SUMMARY

Principles of the invention provide techniques for skin lesion segmentation using deep convolution networks guided by local unsupervised learning. For example, one or more embodiments smooth the initial segmentation of a deep learning based network using super-pixel segmentation as the fine-tuning step in an unsupervised way. In particular, embodiments of the invention refine the boundary of the skin lesion by analyzing the relationship of the super-pixels inside the region of interest (ROI) obtained by deep neural network such as a fully convoluted network.

In one aspect, an exemplary method includes obtaining a dermoscopic image and running a convolutional neural network image classifier on the dermoscopic image to obtain pixelwise prediction scores for presence or absence of a lesion. The exemplary method also includes segmenting the dermoscopic image into a plurality of super-pixels, and computing for each super-pixel a prediction score as the average of the pixelwise prediction scores for all pixels within that super-pixel. The exemplary method further includes computing a mean prediction score across the plurality of super-pixels. The exemplary method also includes constructing an indicator vector Y in which a confidence indicator of "1" is assigned to each super-pixel with a prediction score equal or greater than the mean prediction score, and a confidence indicator of "0" is assigned to each super-pixel with a prediction score less than the mean prediction score. Based on the indicator vector Y, the exemplary method further includes constructing a super-pixel graph G=(V,E,W) wherein $$w_{ij} = \exp\left(-\frac{\|x_i - x_j\|^2}{\sigma}\right) \text{ and } d_i = \sum_{i=1}^{N} w_{ij};$$

computing a confidence score function F according to $\hat{F}=\arg\min(F^T LF + \mu\|F-Y\|^2)$; and integrating the confidence score function F with the pixelwise prediction scores to produce a final segmentation of the dermoscopic image into lesion and background areas.

Exemplary embodiments of the invention include a non-transitory computer readable medium comprising computer executable instructions which when executed by a computer cause the computer to perform the exemplary method; and an apparatus comprising a memory and at least one processor, coupled to said memory, and operative to implement the exemplary method.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Improved segmentation accuracy for identifying boundaries of lesions in medical images.

Unsupervised segmentation of lesion areas from background areas in dermoscopic images, thereby enabling rapid diagnostics.

A failsafe mechanism for segmentation, i.e., when the supervised method gives less correct segmentation, the fine-tuning is more likely to recover it.

These and other features and advantages of the present invention will become apparent from the following detailed description of illustrative embodiments thereof, which is to be read in connection with the accompanying drawings.

DETAILED DESCRIPTION

Figure 1:
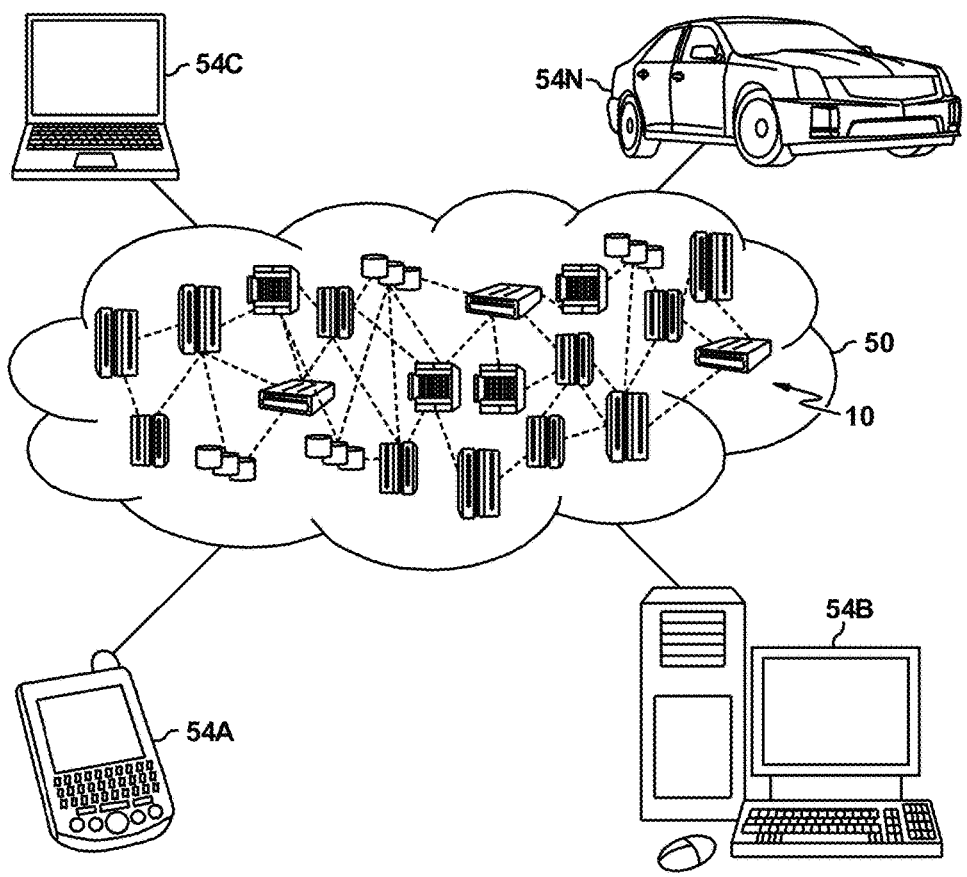
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
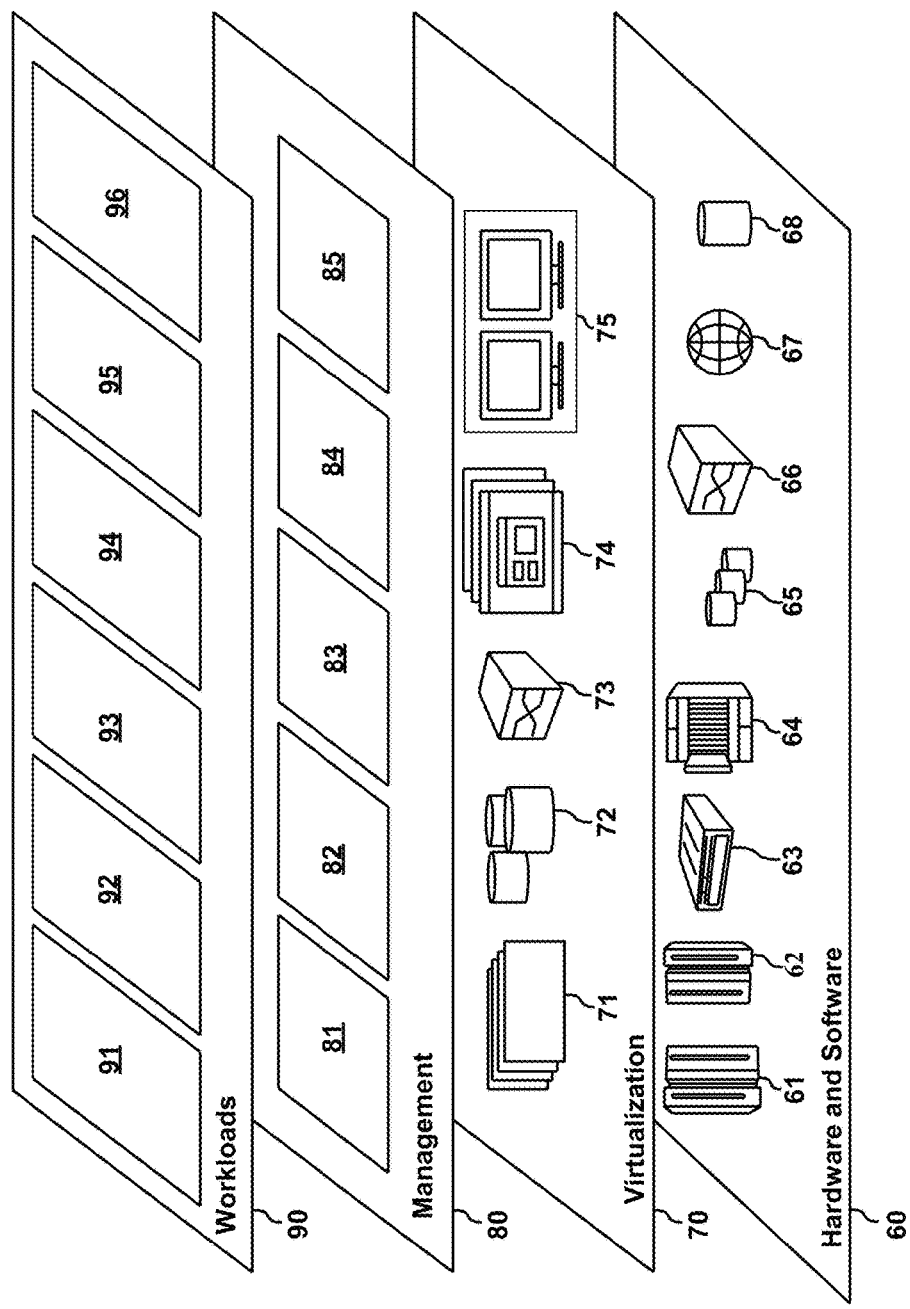
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and skin lesion segmentation 96.

In our method, we smooth the initial segmentation of an image by a deep or convoluted neural network (a "CNN", e.g., a fully convoluted neural network or "FCN"), using super-pixels based segmentation as the fine-tuning step in an unsupervised way. In particular, we refine the boundary of the skin lesion by analyzing the relationship of the super-pixels inside the region of interest (ROI) obtained by a fully convoluted network (an "FCN"). One or more embodiments advantageously overcome drawbacks in the prior art, providing a system which combines global lesion maps obtained from CNN with the local lesion confidence maps using super-pixels. One or more embodiments not only learn the global map for skin lesion, but also acquire the local contextual information such as lesion boundaries for accurate segmentation of lesions. Therefore, one or more embodiments can accurately segment a lesion area within a dermoscopic image, even in the case of fuzzy boundaries and complex textures.

Figure 3:
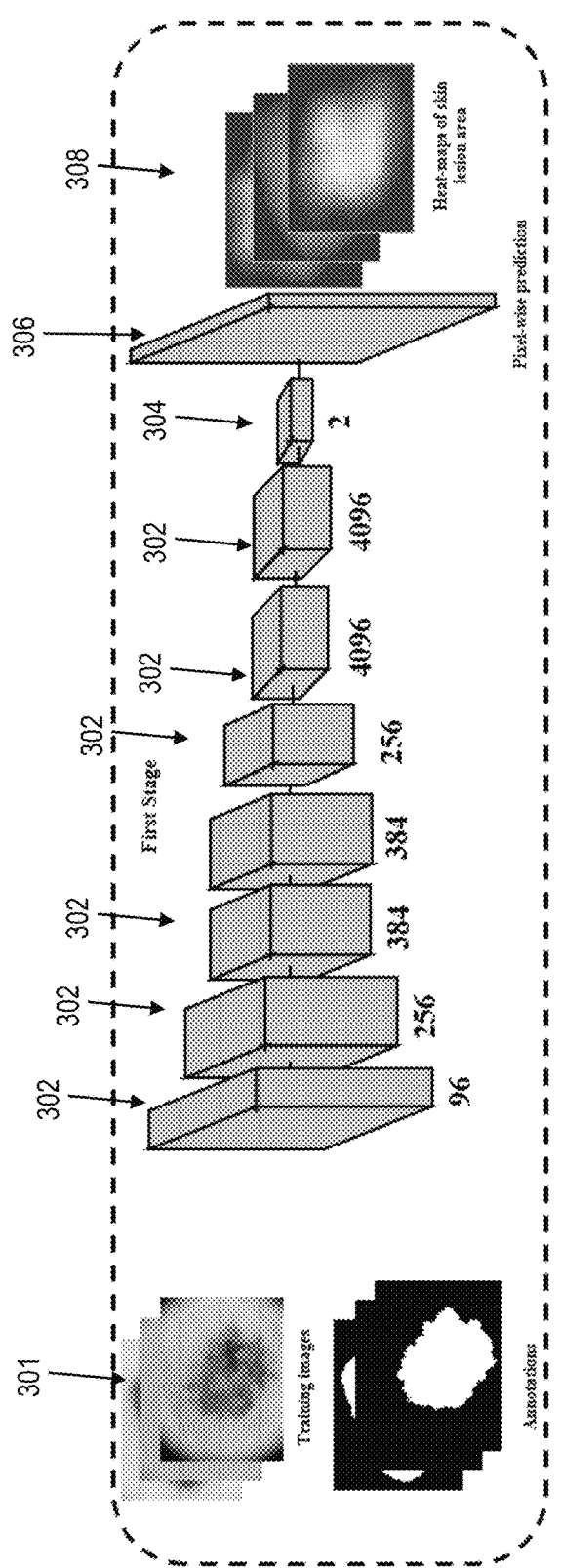
FIG. 3 depicts a first stage of a skin lesion segmentation framework according to embodiments of the invention.

As a first stage of the inventive method, shown in FIG. 3, we obtain a dermoscopic image 301. We then decapitate a CNN such as the Oxford Visual Geometry Group CNN by discarding the final classifier layer, and we convert all fully connected layers to convolutions 302. Other embodiments of the invention could implement other similar CNNs, such as LeNet or AlexNet. We run the convolutions 302 on the dermoscopic image 301, and append a convolution 304 with channel dimension (equals to two), which predicts scores for background and skin lesion. Then we use a deconvolution layer 306 to up-sample the last convolution layer predictions back into the image pixels to obtain pixelwise predictions 308. Based on the pixelwise predictions 308, we identify a region of interest (ROI) that includes pixels with prediction scores that are obtained from output prediction map (softmax layer) of the FCN, which shows the probabilities of images pixels or superpixels belonging to the lesion. The probability is bounded between zero and one, the higher scores indicate the presence of lesion. As an initial matter, the ROI is defined to include those pixels with prediction scores >0.5.

As skin lesions can potentially be imaged from a variety of camera rotations, we also implement an efficient augmentation technique, where the background skin images are fixed and only the image lesion area is rotated by 45, 90, 135, 180, 225 degrees. This means that we augment each image five times and every .pi./4 radians, which our experiments prove improves local segmentation accuracy at the first stage.

Figure 4:
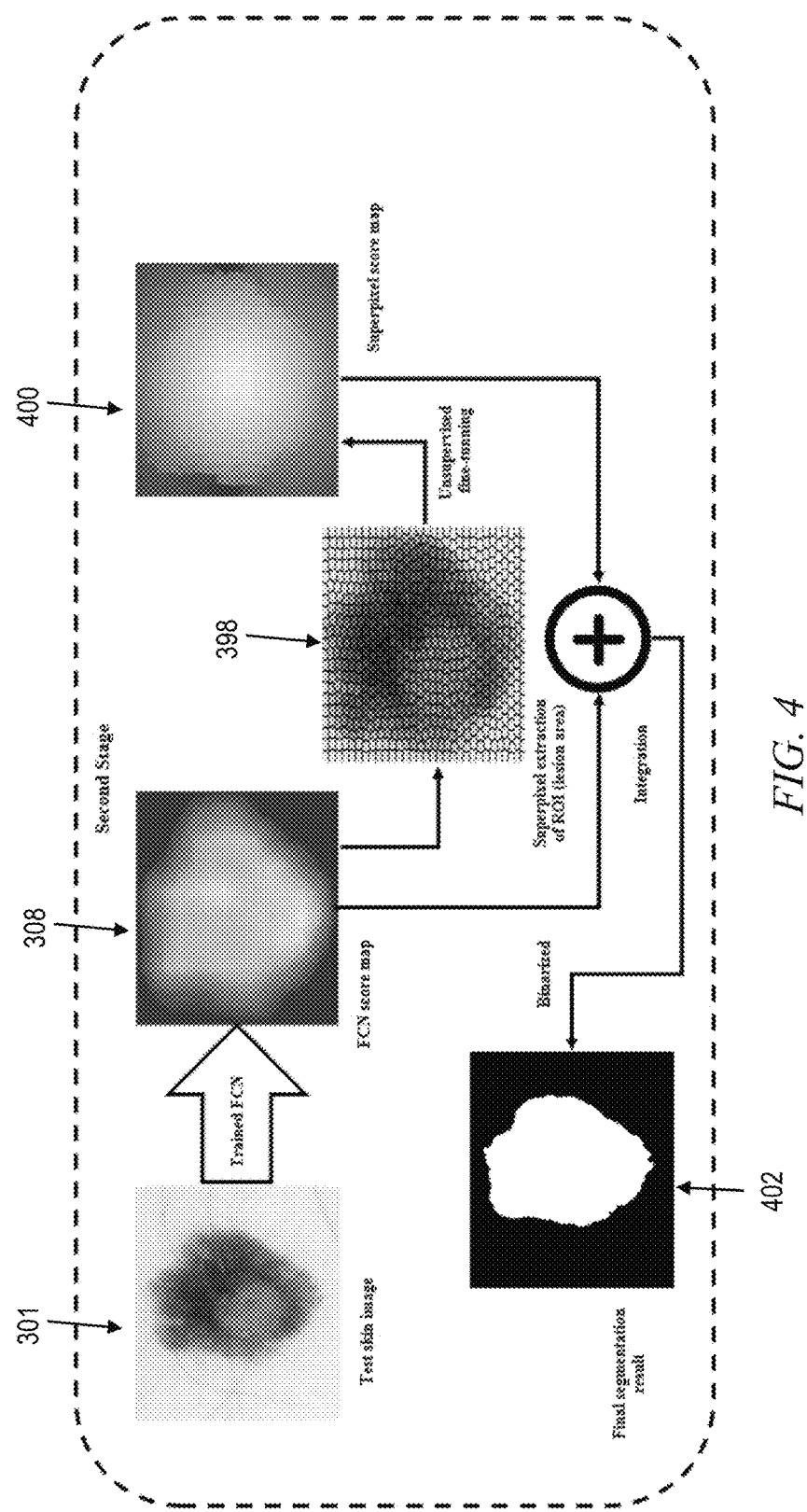
FIG. 4 depicts a second stage of the skin lesion segmentation framework according to embodiments of the invention.

As the second stage, shown in FIG. 4, we use super-pixel image processing (e.g., Simple Linear Iterative Clustering, normalized-cut segmentation, or mean-shift clustering) to segment the dermoscopic image 301. Then we formulate the global image pixel dependencies as an image super-pixel labelling 398 in a graph structure. The average across each super-pixel of image pixels prediction scores from the fully convolutional network is a good measure of the probabilities of image super-pixels belonging to the lesion. The averaged prediction score for each super-pixel is between zero and one. Super-pixels with prediction scores equal or greater than the mean prediction score of all super-pixels are termed as "confident" super-pixels that indicate the presence of a lesion (the super-pixel is within the image lesion area). We then construct an indicator vector Y, in which the confident super-pixels are labelled with 1 or a TRUE value indicating presence of the lesion. Other super-pixels (scores less than the mean prediction score) are labelled with 0 or a FALSE value indicating absence of the lesion (not within the lesion area).

Unlike MRFs based segmentation approaches, one or more embodiments provide an unsupervised super-pixel-based system to refine the segmentation result of a CNN. One or more embodiments achieve better generalization performance when training data are limited or manual labelling of the ground truth is unavailable. One or more embodiments improve the pixel-wise image labelling prediction and CNN based segmentation performance compared to prior art. Furthermore, one or more embodiments are particularly advantageous for an unbalanced dataset, since the lesion area often only occupies a small fraction of image and the ratio of positive pixels (lesion area) and negative pixels (background) is highly unbalanced. One or more embodiments comprise two modules including: CNN based initial segmentation (region of interest extraction) and super-pixel segmentation based fine-tuning. Since the output segmentation score map obtained by CNN is not homogeneous, one or more embodiments formulate the global image pixel dependencies as an image super-pixel labelling in a graph structure.

In our proposed method, we propagate the labels of highly confident super-pixels and infer the labels of the less confident super-pixels based on the similarities between each two super-pixels. Doing so, we obtain a confidence score function $$F=[f_1, \ldots, F_N]^T$$

where N is the number of super-pixels and $f_i$ is the confidence score of each super-pixel between 0 to 1. Then we plot the confidence score function F as a super-pixel heat map 400. Following, we discuss how to obtain the confidence score function F.

First, we project back into the super-pixels the region of interest obtained by the FCN and we impose the mutual relationship between the super-pixels with a graph structure G=(V,E,W), where the super-pixels are represented by the graph vertices V and the edges E between super-pixels specify their feature similarity with the corresponding affinity matrix W. Each element of the affinity matrix W is a symmetric weight $w_{ij}$, which is the distance in the feature space (LAB colour and LBP features) between any two super-pixels i and j:

$$w_{ij} = \exp\left(-\frac{\|x_i - x_j\|^2}{\sigma}\right),$$

where $x_i$ and $x_j$ denote the mean features values of the super-pixels corresponding to two graph vertices, and $\sigma$ is a constant (set to 0.1 experimentally) that scales the strength of the weight $w_{ij}$.

Then, from W we obtain the graph degree matrix D=diag $(d_1, \ldots, d_N)$, in which $d_i = \Sigma_{i=1}^N w_{ij}$. We compute the normalized Laplacian L of the graph, then compute F according to $\hat{F}=\arg \min(F^T L F + \mu \|F-Y\|^2)$. Optimally, $\hat{F}=(D-\lambda W)^{-1}Y$, where $\lambda = 1/1+\mu$ and $\mu=0.01$.

Finally, the prediction score maps (fully convoluted network pixelwise scores 308 and super-pixel confidence score function F) are integrated by summing the weighted scores and assigning a same weight (0.5). This threshold is found by cross-validation over validation set. Based on the integrated prediction score maps, it is possible to generate a final Boolean segmentation result 402. In the final segmentation result, pixels are identified as either belonging to the lesion area or belonging to the background area. The binary classification is based on whether the integrated prediction score exceeds a threshold value on a scale of 0 to 1. Thus, two prediction maps are combined to generate the final prediction map, then we binarize it using Otsu threshold to obtain the final segmentation result.

Figure 5:
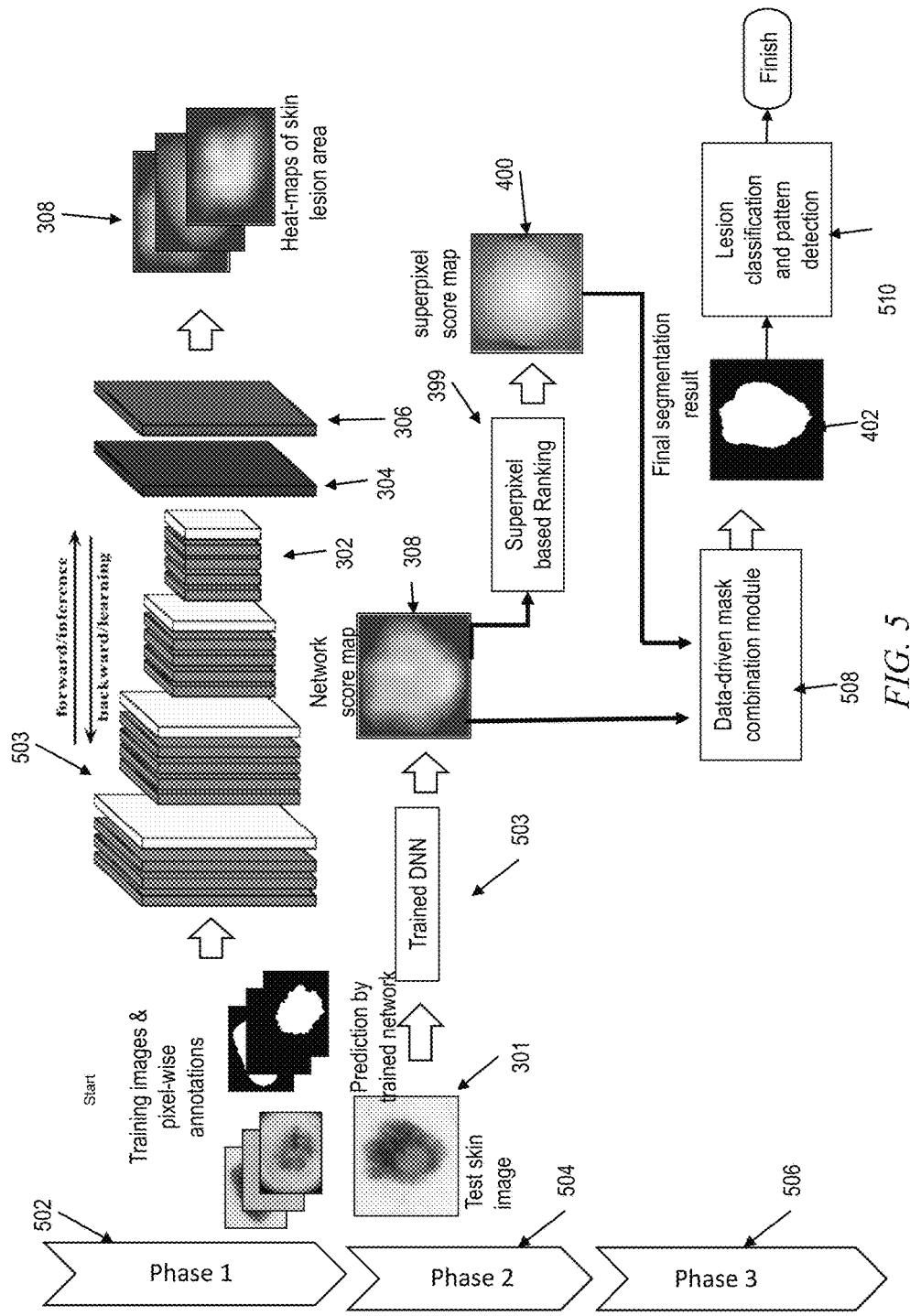
FIG. 5 depicts a three-phase method for skin lesion segmentation using a convolutional network in combination with unsupervised superpixel segmentation, according to embodiments of the invention.

Referring to FIG. 5, operation of the inventive system 96 can be considered in three phases. At a first phase 502, a CNN 503 is trained so that its convolutions 302, 304 and deconvolution layer 306 work together to produce accurate pixelwise heat-maps 308 of skin lesion areas—i.e., heat-maps that match the expert-knowledge ground truth of skin lesion areas across a given training data set. Then at a second phase 504 (segmentation based feature extraction), the trained CNN 503 is applied to a dermoscopic image 301 to produce a pixelwise heat-map 308 of skin lesion area. The pixelwise heat-map 308 is used to identify a region of interest (ROI) for use in the super-pixel based segmentation and ranking algorithm 399 discussed above (computation of the confidence score function F), which produces the super-pixel score map 400. Then at a third phase 506, the pixelwise heat-map 308 is combined with the super-pixel score map 400, according to a data-driven mask combination module 508, to produce the final segmentation result 402. Based on the final segmentation result 402, the system 96 accomplishes automated lesion classification and pattern detection 510 by comparing the final segmentation result to a database of pre-classified images.

Figure 6:
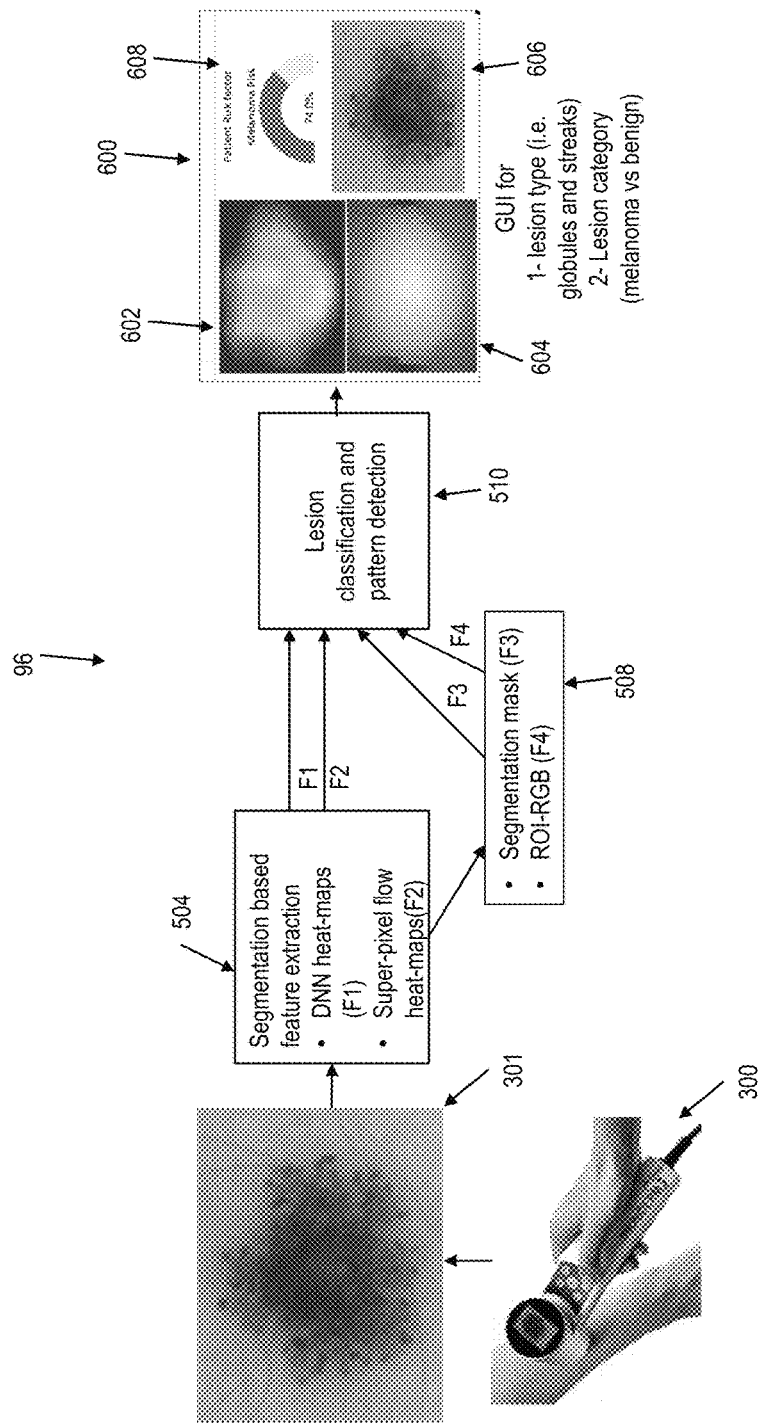
FIG. 6 depicts an overall system flow and graphical user interface according to embodiments of the invention.

FIG. 6 depicts a total flow of the inventive system 96, from capturing 300 the dermoscopic image 301 through segmentation based feature extraction 504 and 508 to lesion classification and pattern detection 510. Results of the system 96 then are displayed at a graphical user interface (GUI) 600. The GUI 600 displays global and local confidence score maps 602, 604 as well as a lesion feature map 606 and an overall risk gauge 608. For example, in FIG. 6 the risk gauge 608 shows a 74% risk of melanoma. This overall risk is computed by using the features obtained from the segmentation mask to train (510) (melanoma classifier) which can be a generic melanoma classifier. A novel aspect of the invention is introducing new patterns obtained from the lesion area itself.

Thus, the image pixels prediction scores from a convolutional neural network (CNN) provide a region of interest (ROI), which shows the probabilities of image pixels or super-pixels belonging to a lesion area. Then, the boundary of the skin lesion is refined by analyzing the relationship of the super-pixels inside the region of interest (ROI). Thus, spatial smoothness of the image patches is considered. For example, the prediction scores are likely to be similar for image patches (super-pixels) that are closely adjacent in the feature space (color feature space). Furthermore, the super-pixels tend to align to the lesion border, which helps to model the fuzzy boundary of the lesion. Thus, in the context of skin lesion segmentation, super-pixel segmentation is an appropriate choice for fine-tuning since super-pixels usually tend to align with lesion boundaries and most pixels within a super-pixel are expected to belong to one homogeneous area.

Given the discussion thus far, and with reference to the drawing Figures, it will be appreciated that, in general terms, an exemplary method, according to an aspect of the invention, includes obtaining a dermoscopic image and running a convolutional neural network image classifier on the dermoscopic image to obtain pixelwise prediction scores for presence or absence of a lesion. The exemplary method also includes segmenting the dermoscopic image into a plurality of super-pixels, and computing for each super-pixel a prediction score as the average of the pixelwise prediction scores for all pixels within that super-pixel. The exemplary method further includes computing a mean prediction score across the plurality of super-pixels. The exemplary method also includes constructing an indicator vector Y in which a confidence indicator of "1" is assigned to each super-pixel with a prediction score equal or greater than the mean prediction score, and a confidence indicator of "0" is assigned to each super-pixel with a prediction score less than the mean prediction score. Based on the indicator vector Y, the exemplary method further includes constructing a super-pixel graph G=(V,E,W) wherein $$w_{ij} = \exp\left(-\frac{\|x_i - x_j\|^2}{\sigma}\right) \text{ and } d_i = \sum_{i=1}^{N} w_{ij};$$

computing a confidence score function F according to $\hat{F}=\arg\min(F^T LF + \mu \|F-Y\|^2)$; and integrating the confidence score function F with the pixelwise prediction scores to produce a final segmentation of the dermoscopic image into lesion and background areas.

According to certain implementations of the exemplary method, the confidence score function F is integrated with the pixelwise prediction scores as the vector of image pixels confidence scores. According to certain implementations of the exemplary method, the final segmentation has a lesion area where at least two adjacent pixels have prediction scores >0.5 and has a background area where at least two adjacent pixels have prediction scores <=0.5. Certain implementations of the exemplary method also include augmenting the dermoscopic image by rotating a lesion area of the dermoscopic image at least once by .pi./4 radians, or by rotating the lesion area at least four times by .pi./4 radians.

According to some implementations of the exemplary method, $\hat{F}=(D-\lambda W)^{-1}Y$. According to select implementations of the exemplary method, the convolutional neural network is based on the Oxford Visual Geometry Group network.

Exemplary embodiments of the invention include a non-transitory computer readable medium comprising computer executable instructions which when executed by a computer cause the computer to perform any of the methods above discussed; and an apparatus comprising a memory and at least one processor, coupled to said memory, and operative to implement any of the methods above discussed.

Figure 7:
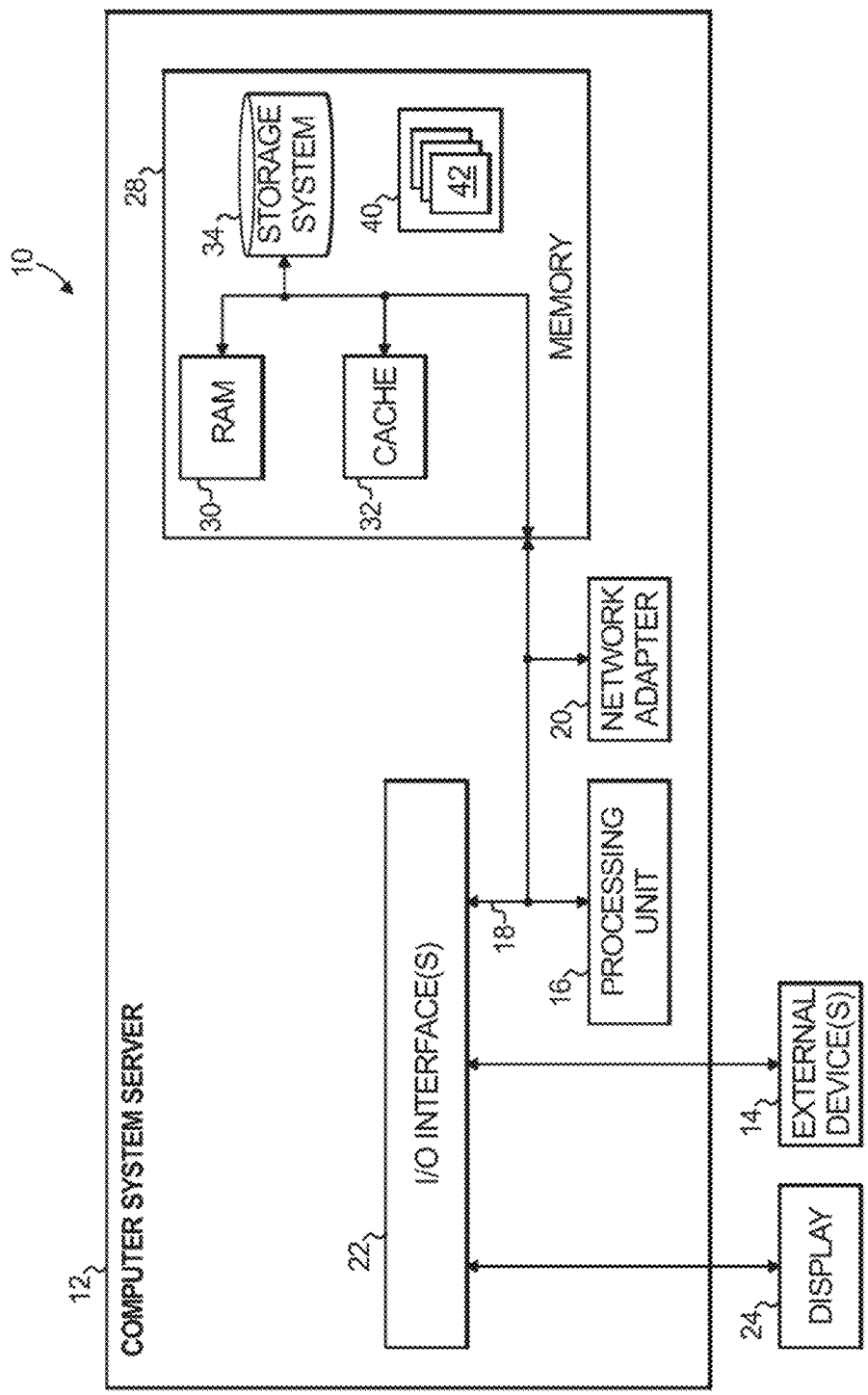
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., computing the confidence vector F in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

obtaining a dermoscopic image;

running a convolutional neural network image classifier on the dermoscopic image to obtain pixelwise prediction scores for presence or absence of a lesion;

segmenting the dermoscopic image into a plurality of super-pixels;

computing for each super-pixel a prediction score as the average of the pixelwise prediction scores for all pixels within that super-pixel;

computing a mean prediction score across the plurality of super-pixels;

constructing an indicator vector Y in which a confidence indicator of "1" is assigned to each super-pixel with a prediction score equal or greater than the mean prediction score, and a confidence indicator of "0" is assigned to each super-pixel with a prediction score less than the mean prediction score;

constructing a super-pixel graph G=(V,E,W) wherein $$w_{ij} = \exp\left(-\frac{\|x_i - x_j\|^2}{\sigma}\right) \text{ and } d_i = \sum_{i=1}^{N} w_{ij},$$

wherein V is a matrix of vertices representing the super-pixels, E is a matrix of edges representing similarities among the super-pixels, W is a matrix of weights of edges representing degrees of similarity among the super-pixels, $w_{ij}$ are elements of W, $x_i$ and $x_j$ are individual super-pixels, σ is a constant that scales the strength of each element of W, and $d_i$ is a degree of super-pixel $x_i$;

computing a confidence score function F according to $\hat{F}$=arg min($F^T L F + \mu \|F - Y\|^2$), wherein L is the Laplacian of F and $\hat{F}=(D-\lambda W)^{-1} Y$, wherein D is a matrix of $d_i$, wherein $\lambda=1/1+\mu$ and $\mu=0.01$; and integrating the confidence score function F with the pixelwise prediction scores to produce a final segmentation of the dermoscopic image into lesion and background areas.

2. The method of claim 1 wherein the confidence score function F is integrated with the pixelwise prediction scores as the vector of image pixels confidence scores.

3. The method of claim 1 wherein the final segmentation has a lesion area where at least two adjacent pixels have prediction scores >0.5 and has a background area where at least two adjacent pixels have prediction scores <=0.5.

4. The method of claim 1 further comprising augmenting the dermoscopic image by rotating a lesion area of the dermoscopic image at least once by .pi./4 radians.

5. The method of claim 4 further comprising augmenting the dermoscopic image by rotating the lesion area at least four times by .pi./4 radians.

6. The method of claim 1 wherein the convolutional neural network is based on the Oxford Visual Geometry Group network.

* * * * *